United States Patent

[11] 3,575,499

| [72] | Inventor | John P. Mahoney, Jr. |
|---|---|---|
| | | Wheatridge, Colo. |
| [21] | Appl. No. | 759,673 |
| [22] | Filed | Sept. 13, 1968 |
| [45] | Patented | Apr. 20, 1971 |
| [73] | Assignee | Honeywell Inc. |
| | | Minneapolis, Minn. |

[54] PREVIEWING APPARATUS
2 Claims, 7 Drawing Figs.

[52] U.S. Cl. .................................................. 353/21, 353/98
[51] Int. Cl. ...................................................... G03b 21/28
[50] Field of Search ........................................ 353/21, 98, 99, 37, 50, 51, 66, 67, 73, 77, 78

[56] References Cited
UNITED STATES PATENTS

| 2,529,664 | 11/1950 | Roysher | 353/99 |
|---|---|---|---|
| 3,249,003 | 5/1966 | Byrd | 353/99X |
| 3,343,454 | 9/1967 | Mahoney | 353/21 |
| 3,348,449 | 10/1967 | Zillmer | 353/21 |
| 3,394,478 | 7/1968 | Rube | 40/78.03 |

FOREIGN PATENTS

| 502,160 | 6/1937 | Great Britain | 353/98 |
|---|---|---|---|

Primary Examiner—Harry N. Haroian
Attorneys—Arthur H. Swanson and John Shaw Stevenson ABSTRACT: A light-transmitting apparatus for a projector to improve the resolution and color of a transparency being focused on a previewing screen wherein an inner spherical wall portion that terminates at its open end in four concave edge portions that form a square is employed as a reflector to reflect a cone of light rays from a light source into a square beam of light rays for passage through a light-diffusing plate and the transparency that are both of substantially the same size as the square beam so that only uniform rays of light that are carrying black, color, or clear portions of the transparency can be focused by means of an inexpensive lens and light stop onto the screen.

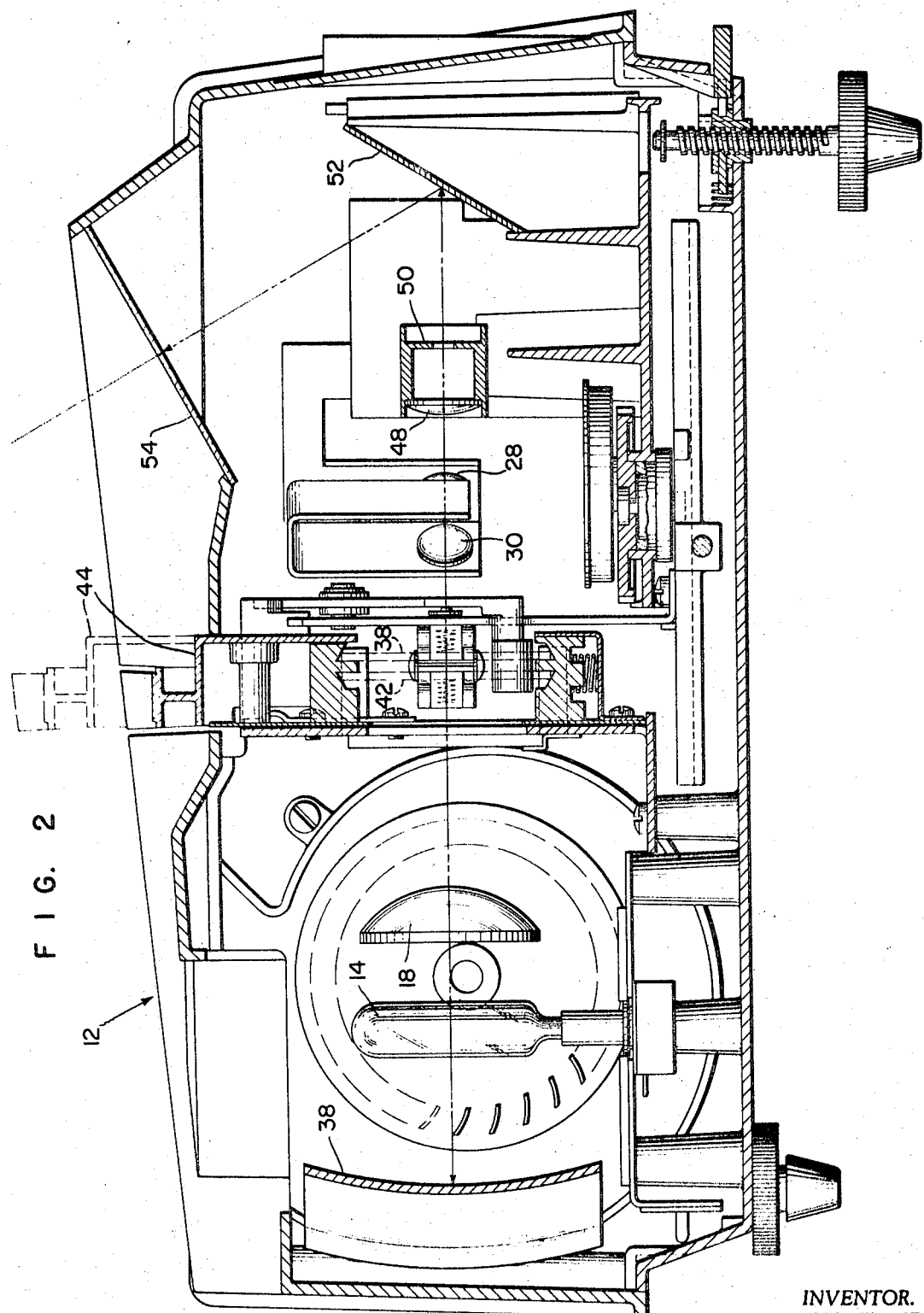

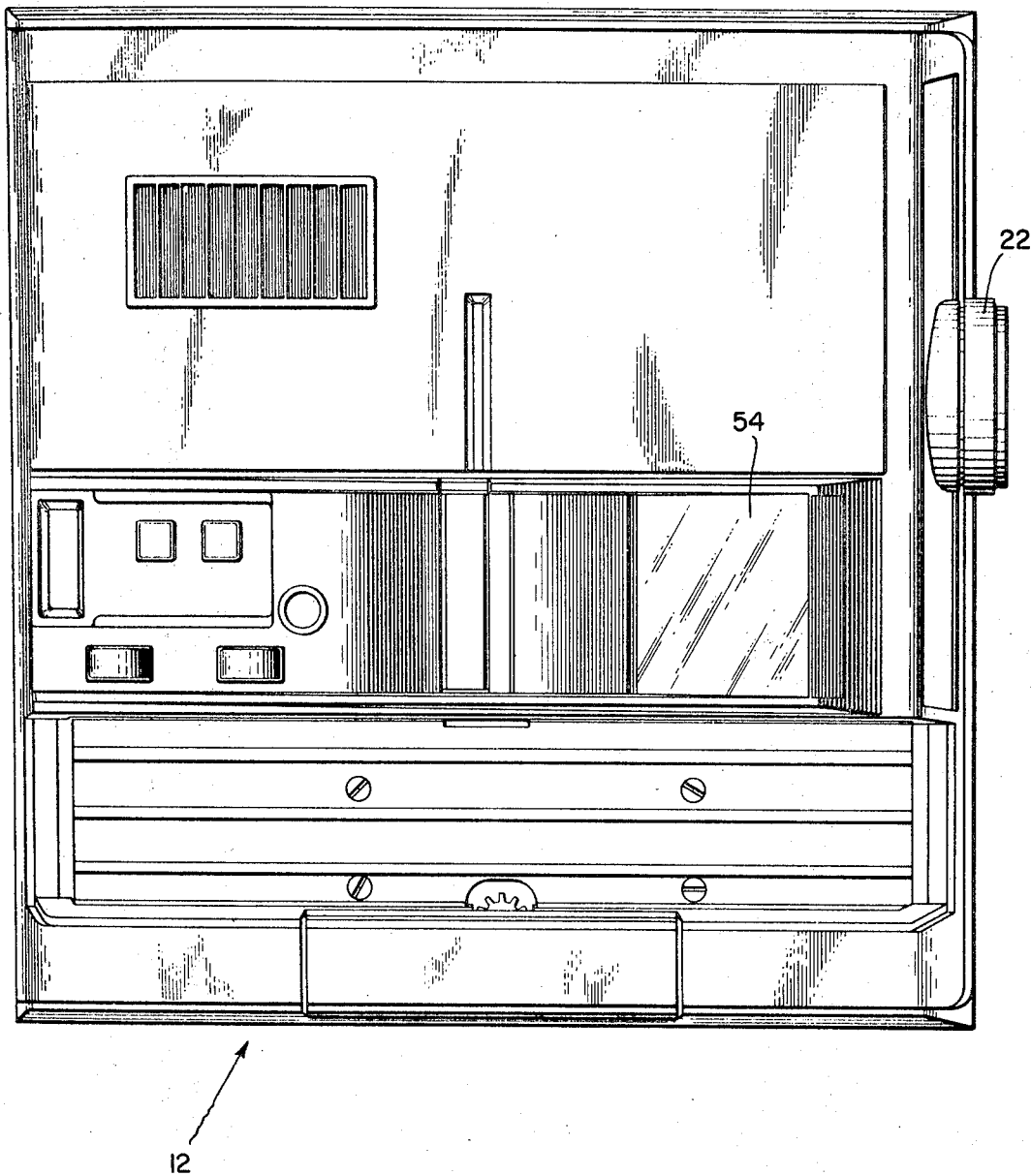

INVENTOR.
JOHN P. MAHONEY, JR.

BY
John Shaw Stevenson
AGENT.

PREVIEWING APPARATUS

It is an object of the present invention to disclose the aforementioned unique inexpensive optical apparatus for a projector that can be beneficially employed to project a transparent slide commonly called a transparency, onto a previewing screen of a projector while another light image of another transparency using the same light source is being projected by this same projector onto a screen located outside the projector.

More specifically, it is another object of the present invention to employ an inexpensive substantially spherical-shaped plate as a reflector and a thin translucent membrane optically aligned with this reflector which can be positioned adjacent a transparency in a preview position to transmit diffused light over the entire surface of the transparency before the record on the transparency is projected by a lens and light stop onto a previewing screen.

It is a more specific object of the present invention to disclose a construction for the reflector employed in the aforementioned optical apparatus that will enable a maximum amount of light from the light source to be transmitted through the previously mentioned thin translucent membrane diffuser and transparency.

It is another object of the present invention to provide an inexpensive optical system that eliminates the need of expensive condensing and multielement objective lenses that have heretofore been required for slide previewers.

It is still another object of the present invention to disclose a previewer that employs the same light source as that used to project a transparency that is in a show position and which single light source is also used to bounce light off of an outer surface of a slide being moved into the projecting position onto a photosensitive element of an automatic focusing mechanism rather than following the costly common practice of employing a separate light source for each of these functions.

It is another object of the present invention to disclose a reflector and a diffuser for the aforementioned optical previewer that will produce an image of a transparency on a preview screen that will show an exceptionally high degree of detail and color that is inherent in the transparency.

A better understanding of the present invention may be had from the following detailed description when read in connection with the accompanying drawing in which:

FIG. 2 is a side elevation view of the previewer taken along the lines 2–2 of FIG. 1;

FIG. 3 is a external plan view of the projector showing the screen onto which the transparency being previewed is projected;

Figure 1:
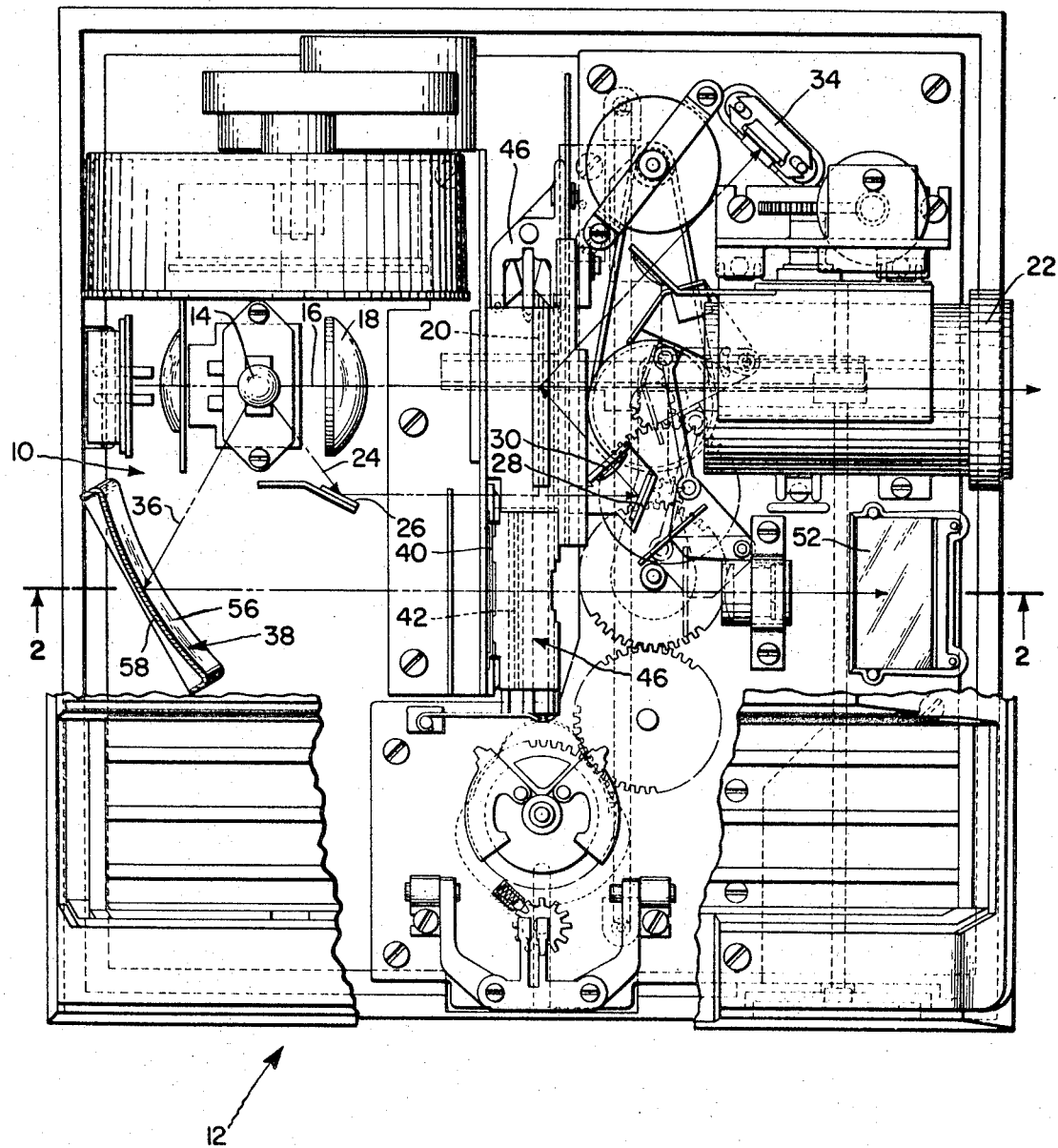
FIG. 1 is an internal view of the projector with the casing partially broken away to show how unique optical parts are employed to preview a transparency before it is placed in a show or projecting position.

A first one of the component parts that are employed in the light-transmitting apparatus 10 of the slide projector 12 is a light source 14 which may be any one of a number of different commercially available varieties but which is preferably of a T–6 clear quartz construction.

This light source 14 is employed to transmit light rays, for example ray 16, emitted therefrom through lens 18, a transparency 20 that is in a show position, through a focusing lens 22 onto a screen, not shown, which is located outside the projector 12.

The light source 14 is also employed to transmit a second set of light rays, for example ray 24, emitted therefrom in series against light-reflecting mirrors 26, 28 through lens 30 against the outer surface of the transparency 20 in the show position onto a light-sensitive element 32 of an automatic focusing unit 34.

The light source 14 is also employed to transmit a third set of light rays, for example ray 36, emitted therefrom in series against a characterized spherical reflector 38 through a diffusing plate 40 and as diffused light through the second transparency 42 that is retained in a preview gate 44 of a slide-changing mechanism 46. The diffuser 40 is preferably made of a polyester sheet material which is made from a reaction between ethylene glycol and terepthelic acid, commonly referred to in the trade as MYLAR.

Figure 4:
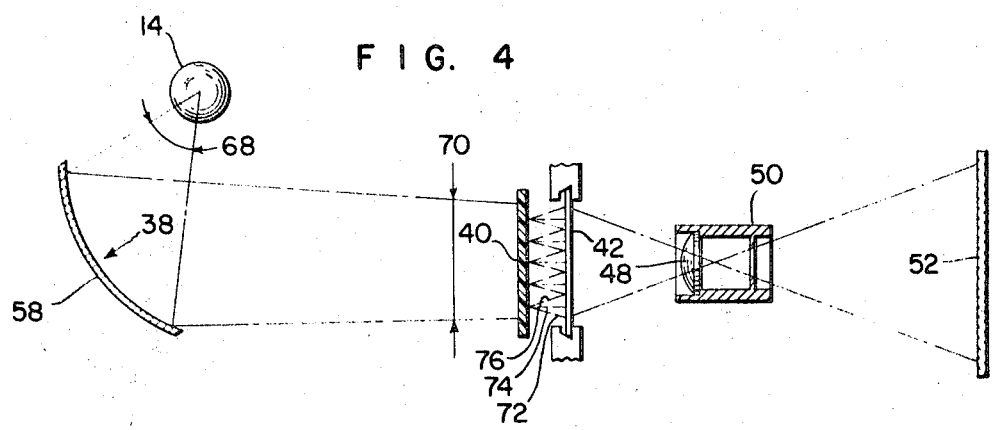
FIG. 4 is a view similar to FIG. 1 but showing the manner in which the characteristically-shaped reflector converts a cone of light rings into a square beam of light rays.

After the diffused light has passed through the second transparency 42 its light image is projected by means of an inexpensive lens 48 and a light stop 50 onto a second reflector 52 that is located within the projector 12 as is shown in detail in FIG. 2 or vertically located as shown in FIG. 4.

The light image of the transparency 42 that has been cast on the sloped second reflector 52 is observed by the projectionist through a viewing window 54 that forms a top wall portion of the projector 12.

It is imperative that maximum use be made of the rays of light that are employed to cast the image and color of the transparency 42 by way of reflector 52 onto the viewing window 54. To accomplish this the reflector 38 is constructed of a metal plate which is preferably aluminum with a bright mirror substantially spherical reflecting surface 56 and a mask 58 on its nonreflecting convex side and which is shown terminating at its open end in four concave edge portions 60, 62, 64 and 66 that form a square.

When the aforementioned construction of a reflector 38 is employed as shown in FIG. 4 a cone of light rays 68 can be received by the reflector and reflected as a square beam of light rays 70 through the diffusing plate 40 and transparency 42 which are each of substantially the same square shape as the square beam of light.

The square light beam focusing construction also allows diffused light rays, such as for example rays 72, 74, 76, to be passed to the right away from the diffusing plate 40 in a uniform scattered manner in different angular directions so that substantially every minute area of the transparency will glow uniformly with a high degree of resolution and an exceptionally high degree of color intensity.

Figure 6:
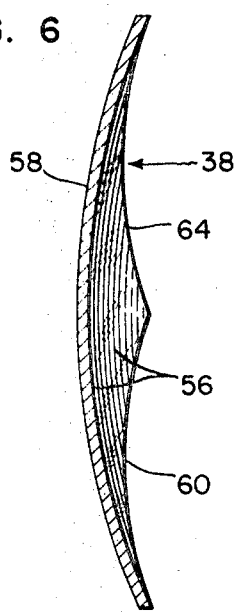
FIG. 6 is a view of the reflector taken along the lines 6–6 of FIG. 5.
Figure 5:
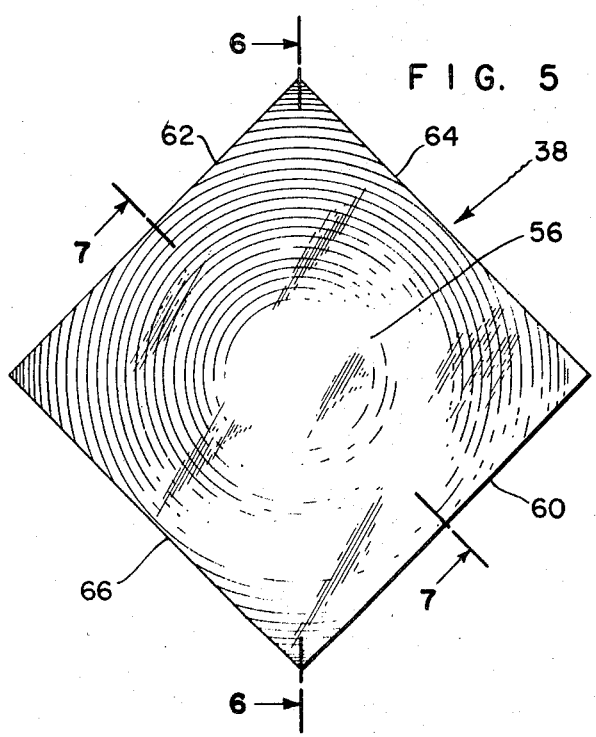
FIG. 5 is a view of the square front face of reflector.
Figure 7:
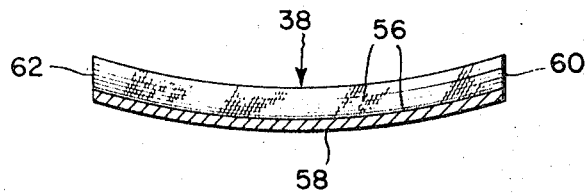
FIG. 7 is a view of the reflector taken along the lines 7–7 of FIG. 5.

The resultant glowing light image will have substantially no undesired uneven light distribution due to the fact that only a square beam of light that is of the same size as the diffusing plate 40 and transparency 42 is allowed to pass through the last two mentioned parts. Hence no uneven light illumination of the image on the screen that would otherwise take place due to the nonuniform light passing through and around the outer edge of the slide can take place as has heretofore been the case when reflectors other than the reflector construction shown in detail in FIGS. 5, 6, and 7 are used.

The resultant glowing light undistorted image of the transparency 42 can then be readily focused by means of an inexpensive lens 48 and the stop 50 onto a second sloping reflector 52 and thence onto the viewing window 54 shown in FIGS. 1 and 2.

The embodiments of the invention in which an exclusive property or privilege is claimed are defined as follows:

I claim:

1. A light-transmitting apparatus for a projector to improve the resolution and color of a transparency that is projected on a screen, comprising a light source, a diffusing means, a reflector constructed to receive a cone of light rays from the light source and to reflect a preselected resulting square beam of light rays therefrom through the diffusing means and the transparency, the said reflector being of a preselected size to emit a square beam of light that is of the same area as the diffusing means and transparency and which will thereby remain within the confines of the diffusing means and transparency and wherein the reflector is of a spherical-shaped configuration and terminates at its open end in edge portions that form a square, and wherein the reflector is constructed of a polished metal surface formed from a wall portion of a hollow sphere, the light source is operably positioned to provide additional rays of light for other optical parts to simultaneously pass light through a second transparency that is in a show position in the projector onto a second screen, to simultaneously reflect still other rays of light from said common light source in series against other reflectors and the second transparency onto a photosensitive surface of an automatic focusing circuit.

2. A light-transmitting apparatus for a projector to improve the resolution and color of a transparency that is projected on a screen, comprising a light source, a diffusing means, a reflector constructed to receive a cone of light rays from the light source and to reflect a preselected resulting square beam of light rays therefrom through the diffusing means and the transparency, the said reflector being of a preselected size to emit a square beam of light that is of the same area as the diffusing means and transparency and which will thereby remain within the confines of the diffusing means and the transparency and wherein the reflector is of a spherical-shaped configuration and terminates at its open end in edge portions that form a square, and wherein the diffusing means is constructed of a plate-shaped configuration that is immediately adjacent said transparency, said diffused light passing through the transparency is focused by way of a lens and optical stop against a secondary reflector onto the screen, and wherein the light source, reflector, diffusing means, single lens and optical stop are fixedly connected to a chassis located within a slide projector and said screen is formed in the casing of the projector for previewing a slide before it is moved to a projecting position.